US012807470B2

(12) United States Patent
Curci

(10) Patent No.: US 12,807,470 B2
(45) Date of Patent: Nov. 24, 2026

(54) POST-MIX BEVERAGE DISPENSING TAP VALVE

(71) Applicant: Michael Curci, Annandale, NJ (US)

(72) Inventor: Michael Curci, Annandale, NJ (US)

( * ) Notice: Subject to any disclaimer, the term of this patent is extended or adjusted under 35 U.S.C. 154(b) by 149 days.

(21) Appl. No.: 18/800,433

(22) Filed: Aug. 12, 2024

(65) Prior Publication Data

US 2024/0400368 A1 Dec. 5, 2024

Related U.S. Application Data

(63) Continuation of application No. 18/446,421, filed on Aug. 8, 2023, now Pat. No. 12,060,257, which is a continuation of application No. 17/656,775, filed on Mar. 28, 2022, now Pat. No. 11,760,621.

(51) Int. Cl.
*B67D 1/14* (2006.01)
*B67D 1/00* (2006.01)

(52) U.S. Cl.
CPC ......... *B67D 1/1438* (2013.01); *B67D 1/0021* (2013.01)

(58) Field of Classification Search
CPC .... B67D 1/1438; B67D 1/0021; B67D 1/005; B67D 1/1466
See application file for complete search history.

(56) References Cited

U.S. PATENT DOCUMENTS 1,957,082 A * 5/1934 Schneible ............ B67D 1/1466 137/589
2,034,623 A * 3/1936 Kraft ...................... B67D 3/043 137/170.6
2,125,102 A * 7/1938 Cornelius ............ B67D 1/1466 137/170.1
2,355,205 A * 8/1944 Daun ................... B67D 1/1466 137/600
2,645,246 A * 7/1953 Segal ................... B67D 1/0082 137/636
2,675,018 A * 4/1954 Bender ................ B67D 1/1455 137/636
2,678,064 A * 5/1954 Brown ................... G05D 11/03 137/636
2,733,730 A * 2/1956 Turak ................... B67D 1/0083 137/613

(Continued)

FOREIGN PATENT DOCUMENTS

DE 102015105376 A1 * 10/2015 ........... B67D 1/1416

*Primary Examiner* — Donnell A Long
(74) *Attorney, Agent, or Firm* — Squire Patent Consulting & IP Law LLC; Brendan E. Squire

(57) ABSTRACT

A post-mix beverage dispensing tap valve to dispense a beverage into a vessel. A connection and mounting assembly is configured for mounting the post-mix beverage dispensing valve a wall and connecting with a source of a beverage product and a source of water. A drafting head is formed as an elongate cylindrical body with an internal bore. A piston shaft is operable by a tap actuator to selectively block and permit a flow of the beverage syrup and the water through the internal bores. The piston shaft carries a seal, a flow guide, and a spring. The seal abuts and seal with the facet to prevent flow through the internal bores. A slight gap between the flow guide and the inner surface of the bore obtains a desired mixture rate between the beverage syrup and the water source by regulating the area of flow around the flow guide.

20 Claims, 4 Drawing Sheets

(56) References Cited

U.S. PATENT DOCUMENTS

| | | | | | |
|---|---|---|---|---|---|
| 2,888,040 | A * | 5/1959 | Terwilliger | B67D 1/0083 | 137/635 |
| 4,078,578 | A * | 3/1978 | Buchholz | B67D 1/1466 | 137/614.19 |
| 4,708,155 | A * | 11/1987 | Austin | B67D 1/1466 | 251/282 |
| 6,041,970 | A * | 3/2000 | Vogel | B67D 1/0462 | 251/120 |
| 6,648,185 | B1 * | 11/2003 | Henry | B67D 1/1466 | 141/351 |
| 2004/0000560 | A1 * | 1/2004 | Henry | B67D 1/14 | 222/59 |
| 2011/0107918 | A1 * | 5/2011 | Santy | B67D 1/0082 | 99/275 |
| 2019/0112176 | A1 * | 4/2019 | Sevcik | B67D 1/145 | |

* cited by examiner

FIG. 1
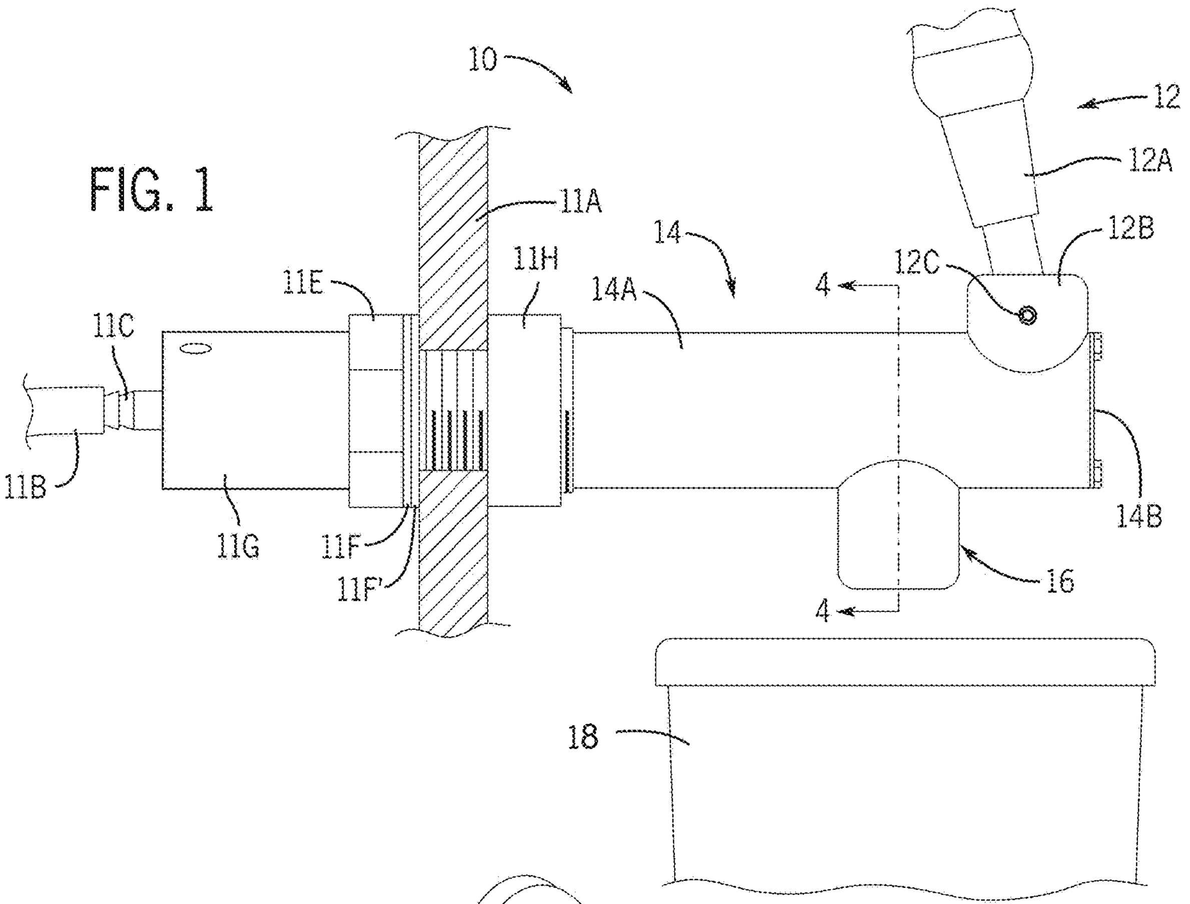
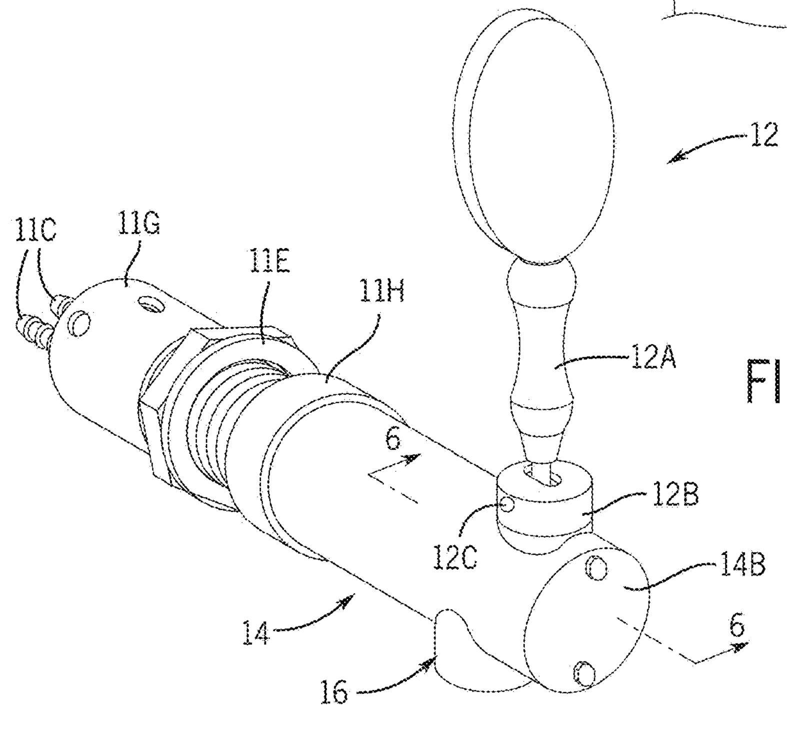
FIG. 2

FIG. 5
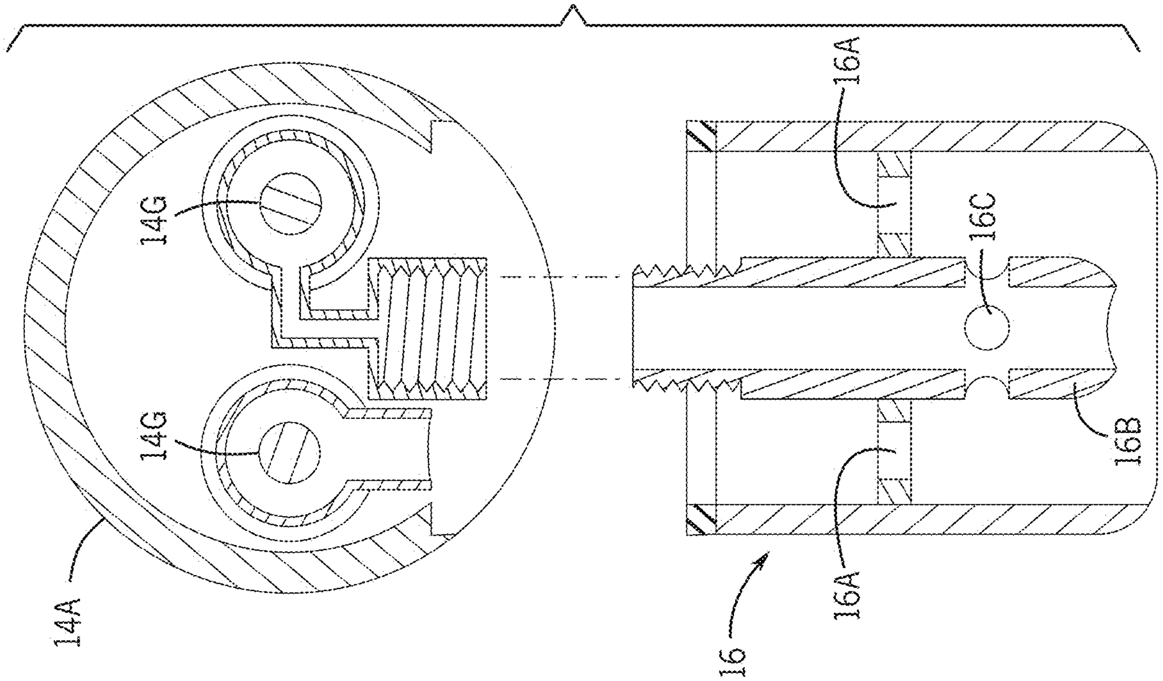
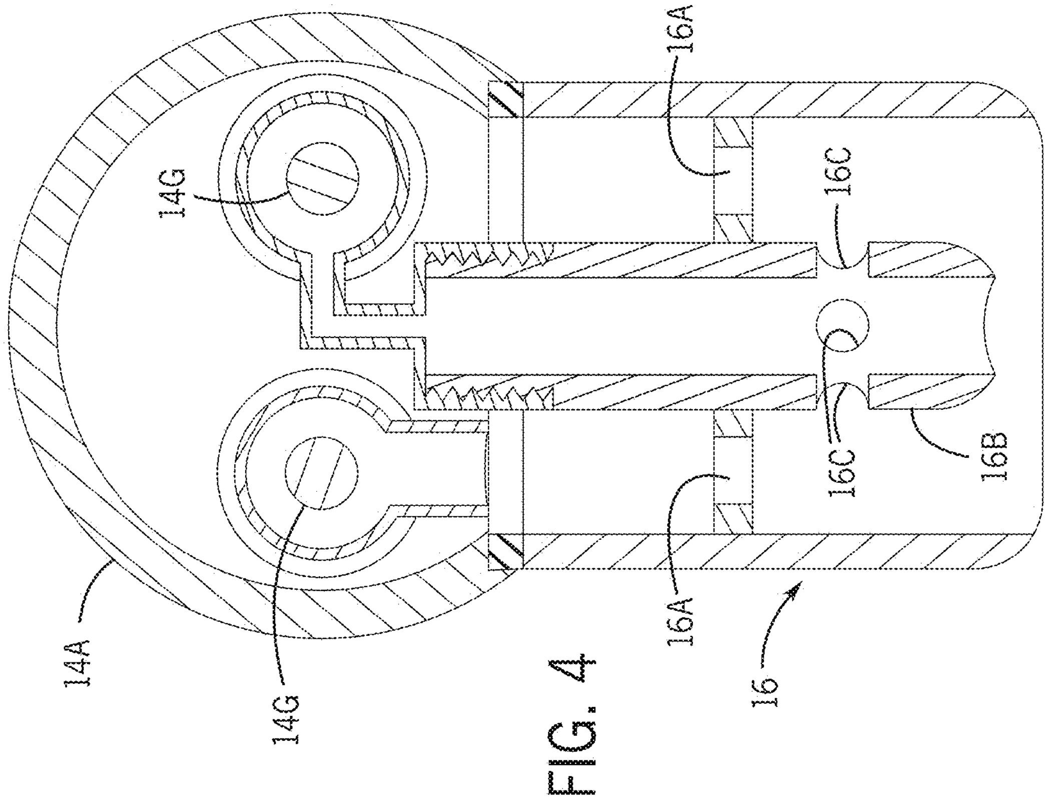
FIG. 4

POST-MIX BEVERAGE DISPENSING TAP VALVE

CROSS-REFERENCE TO RELATED APPLICATION

This application is a continuation of U.S. patent application Ser. No. 18/446,421, filed Aug. 8, 2023, issued Aug. 13, 2024 as U.S. Pat. No. 12,060,257 and claims the benefit of priority of U.S. Pat. No. 11,760,621, issued Sep. 19, 2023, the contents of which are herein incorporated by reference.

BACKGROUND OF THE INVENTION

The present invention relates to beverage dispensing valves, and more particularly to post-mix beverage dispensing valves, commonly referred to as taps.

Draft style taps are well known in the art. However, most current draft style soda taps are intended for pre-mix beverages. That is, they only dispense single liquid product beverages such as beer, wine, or juices.

The only other post-mix tap valve in the field has seals that scrape and rub in the inner walls and cause fast wear and leaks. Post-mix tap valves dispense a beverage syrup, such as a soda or juice, in a first stream with water dispensed in a second stream. The water may be carbonated or uncarbonated, depending upon the type of beverage being mixed. The first stream and the second streams are mixed external of the tap as they are dispensed into a vessel, such as a cup or a pitcher.

The beverage dispensing valves are typically utilized in the restaurant setting, where beverages may be served by a restaurant worker, or by a customer in a self-serve beverage area of the restaurant.

In either instance, the leaks can present a safety hazard to either the restaurant worker or the customer, by making the floor about the dispenser wet. Likewise, the leaks represent a waste of product, an unsightly beverage dispensing area, cleanup, repair, and denial of a selected beverage product to customers while the defective tap is repaired.

As can be seen, there is a need for improved post-mix soda dispensing tap valves that solve these problems.

SUMMARY OF THE INVENTION

In one aspect of the present invention, a dispensing valve for post-mix dispensing of a beverage syrup and a source of water is disclosed. The dispensing valve includes a drafting head formed as an elongate cylindrical body having proximal end and a distal end. A bore for each of a beverage syrup and the source of water extends between the proximal end and the distal end. A proximal end of each bore has a facet oriented in the bore towards the proximal end. A piston shaft is received through each bore. A seal is carried on the proximal end of the piston shaft. The seal is dimensioned for a sealing abutment with the facet. A flow guide is carried on the proximal end of the piston shaft. The flow guide defines a gap between the bore and an outer peripheral surface of the flow guide. A spring is coupled with the piston shaft to retain the flow guide between the seal and the spring. The spring is configured to bias the seal in abutment with the facet for selective delivery of the beverage syrup and the source of water through the drafting head.

In some embodiments, the dispensing valve includes a mounting shank that has a forward end, a back end, a plurality of threads disposed along a length of the mounting shank, and an annular rim extending around the forward end.

A mount collar having a proximal end, a distal end, and an annular shoulder for engagement with the annular rim. A source conduit for each of the beverage syrup and the source of water extend through the mounting shank. A connector is coupled with each source conduit. The connector is dimensioned to be received in within the bores.

In some embodiments, an O-ring is carried on the connector providing a liquid tight seal between the connector and the bore.

In some embodiments, the spring is biased against the connector when the drafting head is coupled with the mounting shank.

In some embodiments, a plurality of threads are disposed within the mount collar. A plurality of threads on a proximal end of the drafting head couple the drafting head with the mounting shank.

In some embodiments, a tap actuator unit is coupled with a tap actuator unit aperture defined at the distal end of the drafting head. The tap actuator unit has a tap handle operable to engage a distal end of each piston shaft to selectively operate the seal between a flow condition and a no-flow condition.

In some embodiments, a cap head provided for coupling the tap actuator unit with the drafting head. The cap head has an elongate slot defined through a top surface thereof. A pivot fork has a pair of downwardly oriented pivot arms. Each pivot arm is positioned to engage with the distal end of each piston shaft. A tap shaft extends upwardly from the pivot fork and extends through the elongate slot. A pivot pin extends through each of the pivot fork and the cap head, such that the tap shaft is pivotally operable within the elongate slot to selectively operate the piston shaft.

In some embodiments, the gap in each bore is selected to provide a desired fluid flow rate for of each of the beverage syrup and the source of water.

In some embodiments, a nozzle and diffuser assembly provides a beverage syrup path and a water path between the bore for dispensing from the drafting head.

In some embodiments, the nozzle and diffuser assembly also include a dispenser port defined in a bottom surface of the drafting head. A beverage syrup nozzle is received within a first hole defined in a bottom of the drafting head between each bore. One the bores is a beverage syrup bore and the first hole is in fluid communication with the beverage syrup bore. Another of the bores is a water bore and a second hole is defined in the bottom of the drafting head and extends into the water bore. A diffuser is carried within a cylindrical cap and surrounds the beverage syrup nozzle. The diffuser receives a water flow from the second hole and dispenses the water around a periphery of the beverage syrup nozzle.

In some embodiments, a plurality of ejection apertures are radially disposed about the beverage syrup nozzle and oriented to eject the beverage syrup into the water dispensed around the periphery of the beverage syrup nozzle.

In other aspects of the invention, a dispensing valve for a is disclosed. The dispensing valve includes a drafting head formed as an elongate cylindrical body having proximal end and a distal end. A bore is defined through the drafting head between the proximal end and the distal end, a proximal end of the bore having a facet oriented in the bore towards the proximal end. A piston shaft is received through the bore. A seal is carried on the proximal end of the piston shaft, the seal is dimensioned for a sealing abutment with the facet. A flow guide is carried on the proximal end of the piston shaft. The flow guide defines a gap between the bore and an outer peripheral surface of the flow guide. A spring is coupled with the piston shaft to retain the flow guide between the seal and the spring. The spring is configured to bias the seal in abutment with the facet for selective delivery of a liquid through the drafting head.

In some embodiments, a mounting shank has a forward end, a back end, a plurality of threads disposed along a length of the mounting shank, and an annular rim extending around the forward end. A mount collar has a proximal end, a distal end, and an annular shoulder projecting inwardly from the proximal end for engagement with the annular rim. A source conduit extends through the mounting shank. A connector is coupled with the source conduit, the connector is dimensioned to be received in within a proximal end of the bore.

In some embodiments, an O-ring is carried on the connector providing a liquid tight seal between the connector and the bore.

In some embodiments, the spring is biased against the connector when the drafting head is coupled with the mounting shank.

In some embodiments, a plurality of threads are disposed within the mount collar. A plurality of threads on a proximal end of the drafting head are configured for coupling the drafting head with the mounting shank.

In some embodiments, a tap actuator unit is coupled with a tap actuator unit aperture defined at the distal end of the drafting head. The tap actuator unit has a tap handle operable to engage a distal end of each piston shaft to selectively operate the seal between a flow condition and a no-flow condition.

These and other features, aspects and advantages of the present invention will become better understood with reference to the following drawings, description and claims.

BRIEF DESCRIPTION OF THE DRAWINGS

FIG. 1 is a side elevation view of the invention in use.

FIG. 2 is a front perspective view of the invention.

FIG. 4 is a cross-sectional view taken on line 4-4 of FIG. 1.

FIG. 5 is an exploded cross-sectional view, similar to FIG. 4.

DETAILED DESCRIPTION

The following detailed description is of the best currently contemplated modes of carrying out exemplary embodiments of the invention. The description is not to be taken in a limiting sense but is made merely for the purpose of illustrating the general principles of the invention.

Broadly, embodiments of the present invention provide a post-mix soda dispensing tap valve that provides wear resistant valve that prevents undesirable seal failure and spillage of beverage mixing ingredients in a post-mix soda dispensing station.

Figure 3:
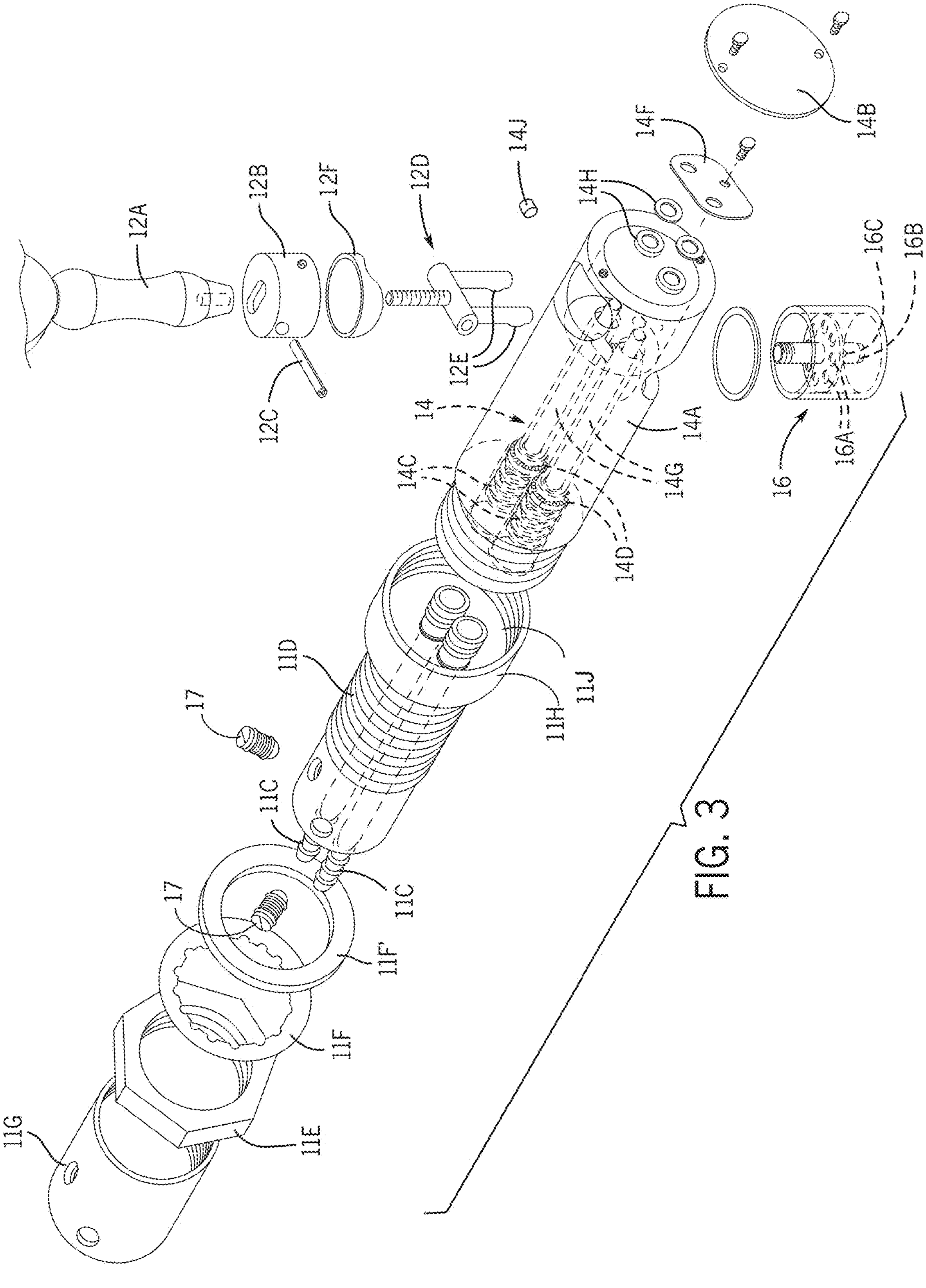
FIG. 3 is an exploded perspective view of the invention.
Figure 6:
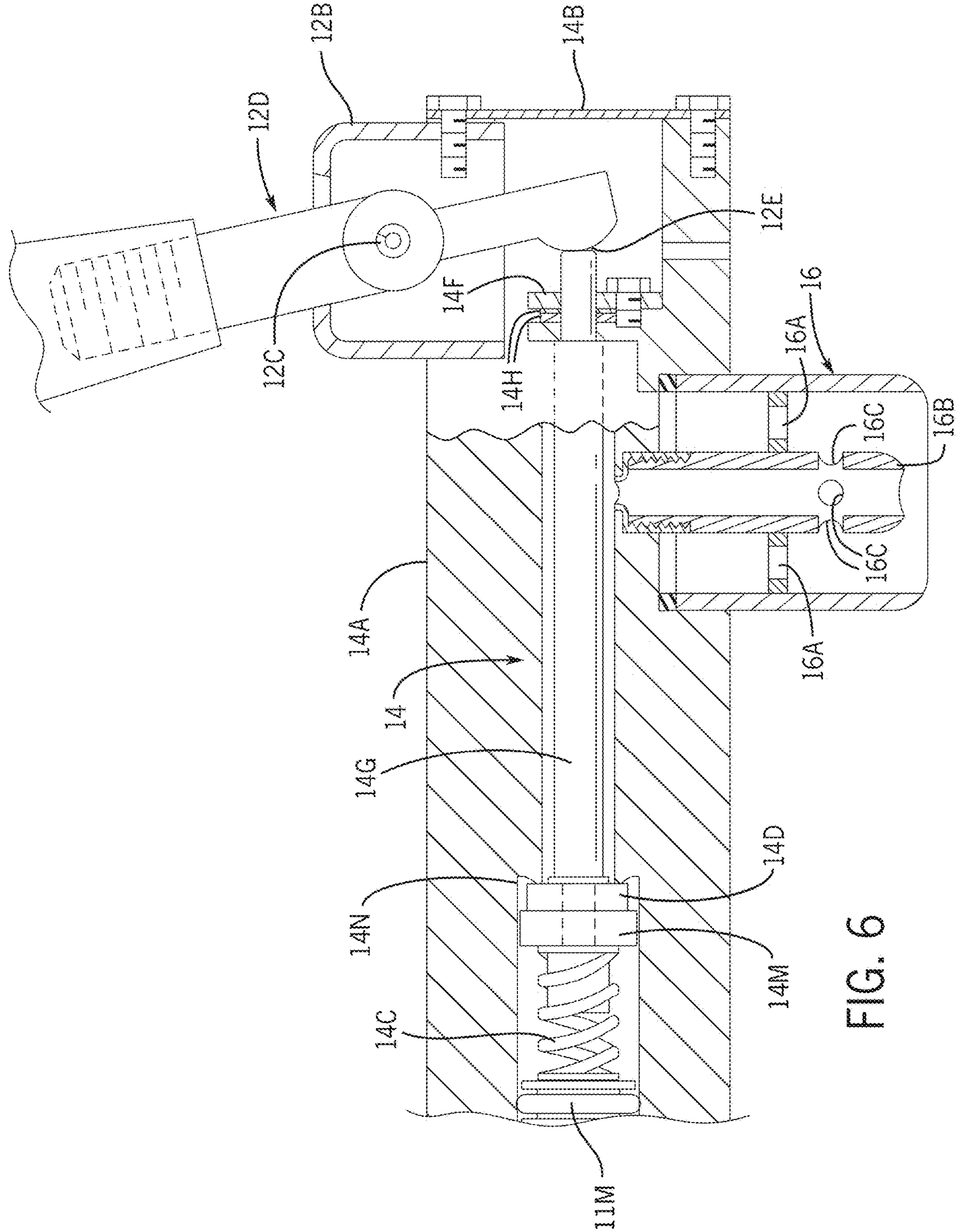
FIG. 6 is a longitudinal sectional view taken on line 6-6 of FIG. 2.

A representative post-mix beverage dispensing tap valve 10 is shown in the drawings of FIGS. 1-6. The post-mix beverage dispensing tap valve 10 is mounted to a wall 11A, or other vertical support structure. The post-mix beverage dispensing tap valve 10 includes a connection and mounting assembly 11 at a rear end, a tap actuator unit 12 at a front end, a drafting head 14; and a nozzle and diffuser assembly 16. The of the post-mix beverage dispensing tap valve 10 is configured to dispense a post-mix beverage into a vessel, such as a cup 18.

The connection and mounting assembly 11 is configured for mounting the post-mix beverage dispensing tap valve 10 to the wall 11A and connecting the post-mix beverage dispensing tap valve 10 with each of a source of a beverage product and a source of water.

A source tube 11B carries each of the source of the beverage product and the source of water and is operatively connected to the post-mix beverage dispensing tap valve 10 at a hose barb of a corresponding source conduit 11C extending from a back end of the connection and mounting assembly 11. The source conduits 11C are carried through an interior of a mounting shank 11D to a forward end of the mounting shank 11D.

The mounting shank 11D includes a plurality of threads for engagement with a mounting nut 11F. One or more washers 11F, 11F' may be provided for carriage on the mounting shank 11D. A rear collar 11G may be applied to retain the nut 11F in position on the mounting shank 11D. The rear collar may be secured to the mounting shank 11D via one or more set screws 17 received in an aperture on the mounting shank 11D.

A mount collar 11H is provided at a forward end of the mounting shank 11D. The mount collar 11H is retained by an annular rim 11J at a forward end of the mounting shank 11D. The mount collar 11H provides a recess 11K in which a front end of the source conduits 11C terminate. The mount collar 11H has a plurality of threads 11L for coupling with a corresponding plurality of threads 14L disposed on an aft end of the drafting head 14. A washer, or O-ring 11M is provided about the front end of the source conduits 11N to provide a liquid tight fitting between a coupling 11N at a front end the source conduit 11C and a bore 14B defined in an aft end of the drafting head 14. The coupling 11N at the front end of the source conduits 11C may be provided by one or more of a threaded coupling, a press fit coupling, or a welded coupling with the mounting shank 11D.

The mounting assembly 11 is mounted to a wall 11B by passing the aft end of the mounting shank 11D through a hole in the wall 11B. An aft surface of the mount collar 11H has an outer diameter that is greater than the hole in the wall 11B and provides a front retainer against a first surface of the wall 11B. The nut 11E, and any accompanying washers 11F, 11F' are then threaded along an aft end of the mounting shank 11D to tighten against an opposite second surface of the wall 11B.

The drafting head 14 is formed as an elongate cylindrical body 14A having an internal bore 14B that extends between a proximal end and a distal end of the cylindrical body 14A for each of the beverage source and the water source. An inner diameter of the proximal end of each internal bore 14B is dimensioned for a liquid tight coupling with O-rings 11M surrounding the coupling 11N. The proximal end of the internal bore 14B is formed with a shouldered facet 14N oriented to an inlet of the internal bore 14B.

A piston shaft 14G has a proximal end, oriented towards the mounting shank 11D, and a distal end, oriented towards the nozzle and diffuser assembly 16. The piston shaft 14G is operable by the tap actuator unit 12 to selectively block and permit a flow of each of the beverage syrup and the water through the internal bores 14B.

A proximal end of the piston shaft 14G carries a seal 14D, a flow guide 14M, and a spring 14C. The seal 14D is dimensioned to abut and seal with the facet 14N to prevent flow of the beverage syrup and the water through the internal bores 14B. The flow guide 14M is dimensioned to define a slight gap between a peripheral edge surface of the flow guide 14M and the inner surface of the proximal end of the bore 14B. The dimensions of the gap may be varied to obtain a desired mixture rate between the beverage syrup and the water source by regulating the area of flow around the flow guide 14M.

A distal end of the spring 14C may be retained on a proximal end of the piston shaft 14G via a radial compression about the shaft of the piston shaft 14G. This joining of the spring 14C with the piston shaft 14G retains each of the flow guide 14M and the seal 14D on the piston shaft 14G. A proximal end of the spring 14C abuts with a distal end of the coupling 11N. The spring 14C biases the seal 14D in abutment with the facet 14N, when the drafting head 14 is coupled with the mounting shank 11.

A distal end of the drafting head 14 is configured with plunger retainer 14F. The plunger retainer 14F has an aperture 14F' for each piston shaft 14D, such that a distal end of each piston shaft 14G extends beyond the distal end of the drafting head 14. The aperture 14F' is dimensioned to receive a distal end of the piston shaft 14G. A seal 14H is provided for sealing about the piston shaft 14G and the distal end of each bore 14B by compression of the plunger retainer 14F against the seal 14H and a sealing fit of the seal 14F about the diameter of the piston shaft 14G. The plunger retainer 14F may be secured to the elongate cylindrical body by a fastener, such as a screw.

The tap actuator unit 12 is coupled with a tap actuator unit aperture 14P defined through a top surface of the elongate cylindrical body 12 at the distal end of the elongate body 14. The tap actuator unit 12 includes a tap handle 12A, a head cap 12B, a pivot pin 12C, a pivot fork 12D and a collar 12F. The tap handle 12A is pivotally actuated in a fore and an aft direction to selectively operate each of the piston shafts 14G between a flow and a no-flow position.

The pivot fork 12D has a pair of downwardly oriented pivot arms 12E that are receive through the tap actuator unit aperture 14P to engage with the distal ends of the piston shafts 14G. The pivot fork 12D is pivotally carried on the pivot pin 12C, which is coupled with the head cap 12B. The collar 12F closes the tap actuator unit aperture 14P when positioned between the head cap 12B and the elongate cylindrical body 14B. The pivot fork 12D includes a tap shaft 12G that extends through a slotted aperture in the head cap 12B for attachment of the tap handle 12A.

When actuated by the tap handle 12A, the fork arms 12E actuate the piston shafts 14G to open the seal 14D and permit flow of the beverage syrup and the water through their respective bores 14B. The flow of each of the beverage syrup is carried through the bores 14B and delivered to the nozzle and diffuser assembly 16. An outer plate 14B.

The nozzle and diffuser assembly 16 provides a beverage syrup path and a water path between the respective bores 14B for delivery into the vessel 18. The nozzle and diffuser assembly 16 is formed a cylindrical cap that is coupled with the drafting head 14 via a dispenser port 14Q defined in a bottom surface of the drafting head 14 at the distal end of the bores 14B. The nozzle and diffuser assembly 16 includes a diffuser 16A, a beverage syrup nozzle 16B, which may include a plurality of laterally oriented ejection apertures 16C for directing a lateral flow of the beverage syrup into a downward flow of the water from the diffuser 16A, and a gasket 16D.

As best seen in reference to FIGS. 4 and 5, the beverage syrup nozzle 16B is received in a threaded bore 14R extending into the drafting head 14. To provide a coaxial alignment of the beverage syrup nozzle 16B and a longitudinal alignment of the nozzle and diffuser assembly 16, the threaded bore 14R is defined between each of the bores 14B, 14B'. The beverage syrup path is defined between the threaded bore 14R and the syrup delivery bore 14B'.

The water path is provided by drilling a second hole 14U to interconnect the water delivery bore 14B with the with the dispenser port 14Q. In this case the water is delivered via the water delivery bore 14*b* and is received upstream of the diffuser 16A. As the water exits the diffuser 16A it is mixed with the beverage syrup as the two ingredients are dispensed into the cup 18.

When the drafting head 14 is fabricated by conventional machining, the beverage syrup path is defined by drilling a first hole 14S extending from an end of the threaded bore 14R and a third hole 14T extending from the beverage syrup delivery bore 14B' and intersecting with the first hole 14S. Because the beverage syrup delivery bore 14B' is contained within the elongate cylindrical body 14A, the third hole 14T will need to be drilled through a lateral sidewall of the cylindrical body 14A. In this case, a plug 20 is used to seal the hole in the lateral sidewall of the elongate cylindrical body 14A to constrain the beverage syrup flow to the beverage syrup delivery path. As will be appreciated, the drafting head 14 may also be formed by an additive fabrication process, in this case, the internal passages for the beverage syrup path need only connect the beverage syrup bore 14B' with the beverage syrup nozzle 16B.

It should be understood, of course, that the foregoing relates to exemplary embodiments of the invention and that modifications may be made without departing from the spirit and scope of the invention as set forth in the following claims.

I claim:

1. A dispensing valve for post-mix dispensing of a first liquid and a second liquid, comprising:

a head formed as an elongate cylindrical body having proximal end and a distal end, a first bore for communicating the first liquid through the head, a second bore for communicating the second liquid through the head, and a coupling disposed at the proximal end of the head;

a first piston shaft and a second piston shaft disposed in the first bore and the second bore, respectively, each piston shaft having a seal and a spring configured to axially bias the seal in abutment with a facet defined in each of the first bore and the second bore;

a nozzle disposed at the distal end of the head having a first liquid path in communication with the first bore and a second liquid path in communication with the second bore, the nozzle configured to dispense the first liquid and the second liquid a tap actuator unit coupled with the distal end of the head, the tap actuator unit comprising: a pivot fork having a pair of downwardly oriented pivot arms, each pivot arm positioned to engage with the distal end of a respective one of the first piston shaft and the second piston shaft; a tap shaft extending upwardly from the pivot fork that is pivotally operable to simultaneously actuate the seal on the first piston shaft and the seal on the second piston shaft to selectively deliver the syrup and the water through the head; and a connection and mounting assembly having a forward end and an aft end, a mount collar disposed at the forward end configured to rotationally couple with the proximal end of the head, a mounting shank disposed at the aft end configured to couple the connection and mounting assembly with a vertical support structure.

2. The dispensing valve of claim 1, further comprising:
a plurality of threads disposed along a length of the mounting shank, and
a fastener dimensioned to cooperatively engage with the plurality of threads to secure the connection and mounting assembly with the vertical support structure.

3. The dispensing valve of claim 1, further comprising:
an annular rim extending around the forward end of the mounting shank;
the mount collar having a proximal end, a distal end, an annular shoulder projecting inwardly from the proximal end for engagement with the annular rim; and
a source conduit for each of the first liquid and the second liquid extending through the mounting shank.

4. The dispensing valve of claim 3, further comprising:
a connector adapted to couple with each source conduit, the connector dimensioned to be received within the first bore and the second bore.

5. The dispensing valve of claim 4, further comprising:
an O-ring carried on the connector providing a liquid tight seal between the connector and each of the first bore and the second bore.

6. The dispensing valve of claim 1, further comprising:
a plurality of threads disposed within the mount collar; and
a plurality of threads on the proximal end of the head for coupling the head with the mounting shank.

7. The dispensing valve of claim 1, further comprising:
the tap actuator unit coupled with a tap actuator unit aperture defined at the distal end of the head, the tap actuator unit carrying a tap handle coupled with the tap shaft.

8. The dispensing valve of claim 7, further comprising:
a cap head for coupling the tap actuator unit with the head, the cap head having an elongate slot defined through a top surface thereof;
a
the tap shaft extending upwardly from the pivot fork and extending through the elongate slot; and
a pivot pin extending through each of the pivot fork and the cap head, wherein the tap shaft is pivotally operable within the elongate slot to selectively operate the first piston shaft and the second piston shaft.

9. The dispensing valve of claim 1, further comprising:
a dispenser port defined in a bottom surface of the head;
a beverage syrup nozzle received within a first hole defined in a bottom of the head between each bore, wherein the first bore is a beverage syrup bore and the first hole is in fluid communication with the beverage syrup bore;
wherein the second bore is a water bore, a second hole is defined in the bottom of the head and extends into the water bore; and
a diffuser carried within a cylindrical cap and surrounding the beverage syrup nozzle, the diffuser receiving a water flow from the second hole and dispenses water around a periphery of the beverage syrup nozzle.

10. The dispenser valve of claim 9, further comprising:
a plurality of ejection apertures radially disposed about the beverage syrup nozzle oriented to eject the beverage syrup into the water dispensed around the periphery of the beverage syrup nozzle.

11. A dispensing valve for post-mix dispensing of a first liquid and a second liquid, comprising:
a drafting head formed as an elongate cylindrical body having proximal end and a distal end,
a first bore and a second bore defined in the drafting head between the proximal end and the distal end with a facet defined in and oriented towards an inlet of each of the first bore and the second bore;
a first piston shaft and a second piston shaft disposed in the first bore and the second bore, respectively, each piston shaft having a seal and a spring configured to bias the seal in abutment with the facet;
and
a tap actuator unit coupled with the distal end of the drafting head, the tap actuator unit having a pivot fork having a pair of downwardly oriented pivot arms that is operable such that the pair of downwardly oriented pivot arms simultaneously engage with a distal end of each of the first piston shaft and the second piston shaft to selectively operate the seal between a flow condition and a no-flow condition.

12. The dispensing valve of claim 11, further comprising:
a plurality of threads disposed within the mount collar; and
a plurality of threads on the proximal end of the drafting head for coupling the drafting head with the mounting shank.

13. The dispensing valve of claim 11, further comprising:
an O-ring carried on the connector providing a liquid tight seal between the connector and each bore.

14. The dispensing valve of claim 11, further comprising:
a flow guide disposed within each of the first bore and the second bore, the flow guide defining a gap between each bore and an outer peripheral surface of the flow guide, the gap selected to obtain a desired mixture rate of at least one of the first liquid and the second liquid.

15. The dispensing valve of claim 14, further comprising:
a seal operably carried on a piston shaft within each of the first bore and the second bore, the seal operable between a flow condition and a no-flow condition.

16. The dispensing valve of claim 15, further comprising:
a spring coupled with the piston shaft to retain the flow guide between the seal and the spring, the spring configured to bias the seal for selective delivery of a liquid through the drafting head.

17. The dispensing valve of claim 16, wherein the spring is biased against the connector when the drafting head is coupled with the mounting shank.

18. The dispensing valve of claim 15, further comprising:
a tap actuator unit coupled with a tap actuator unit aperture defined at the distal end of the drafting head, the tap actuator unit having a tap handle operable to engage a distal end of each piston shaft to selectively operate the seal between a flow condition and a no-flow condition.

19. A dispensing valve for post-mix dispensing of a first liquid and a second liquid, comprising:
a drafting head formed as an elongate cylindrical body having proximal end and a distal end, a mounting shank at the proximal end, a nozzle and diffuser assembly, and a tap actuator unit coupled with the distal end;
a first bore and a second bore defined in the drafting head between the proximal end and the distal end, each of the first bore and the second bore having a raised shouldered facet oriented to an inlet of the respective bore;
a piston shaft carried within each of the first bore and the second bore, the piston shaft having a proximal end, oriented towards the mounting shank, and a distal end, oriented towards the nozzle and diffuser assembly, each piston shaft is operable by the tap actuator unit to selectively block and permit a flow of each of the beverage syrup and the water through the respective first bore and second bore; and the tap actuator unit comprising a pivot fork having a pair of downwardly oriented pivot arms, each pivot arm positioned to engage with the distal end of a respective one of the first piston shaft and the second piston shaft; a tap shaft extending upwardly from the pivot fork that is pivotally operable to simultaneously actuate a seal on the first piston shaft and a seal on the second piston shaft.

20. The dispensing valve of claim 19, further comprising:

the seal carried on the proximal end of each piston shaft is dimensioned to abut and seal with the facet to prevent flow of the first liquid and the second liquid through the respective first bore and second bore.

* * * * *